(12) United States Patent
Shih

(10) Patent No.: US 6,588,923 B1
(45) Date of Patent: Jul. 8, 2003

(54) LIGHT-EMITTING STRUCTURE MOUNTED ON AN EXHAUST TAILPIPE OF AN AUTOMOBILE OR MOTORCYCLE

(76) Inventor: Jen-Hsieh Shih, No. 1, Lane 174, Chung-Yang Road, Chang Hua City (TW)

( * ) Notice: Subject to any disclaimer, the term of this patent is extended or adjusted under 35 U.S.C. 154(b) by 0 days.

(21) Appl. No.: 10/115,758

(22) Filed: Apr. 5, 2002

(51) Int. Cl.[7] ............... B60Q 1/26; F21S 8/10
(52) U.S. Cl. ............ 362/487; 362/96; 362/234; 362/248; 362/545
(58) Field of Search ............ 362/96, 234, 248, 362/473, 487, 496, 545, 547, 294

(56) References Cited

U.S. PATENT DOCUMENTS

| | | | |
|---|---|---|---|
| 5,036,248 A | * | 7/1991 | McEwan et al. ............ 313/500 |
| 5,544,929 A | * | 8/1996 | Nagai ............ 362/492 |
| 5,964,312 A | * | 10/1999 | Maldonado ............ 362/473 |
| 6,471,377 B1 | * | 10/2002 | Stegall ............ 362/487 |
| 6,491,418 B1 | * | 12/2002 | Chen ............ 362/487 |

* cited by examiner

Primary Examiner—Alan Cariaso
(74) Attorney, Agent, or Firm—Harrison & Egbert

(57) ABSTRACT

A light-emitting structure is intended to be mounted on the exhaust tailpipe of a motor vehicle and formed of a tubular connector, an electronic control board, and a light shield. The tubular connector is fastened at the inner end to the exhaust tailpipe and provided with a fume channel via which exhaust fume is discharged into atmospheric air. The control board is fastened to the outer end of the tubular connector such that the control board is separated from the fume channel by a heat-insulating material. The light shield is provided with a plurality of grooves and is fastened to the outer end of the tubular connector, so as to shield the control board. The control board comprises an integrated circuit and a plurality of light-emitting bodies which are corresponding in location to the grooves of the light shield.

3 Claims, 4 Drawing Sheets

LIGHT-EMITTING STRUCTURE MOUNTED ON AN EXHAUST TAILPIPE OF AN AUTOMOBILE OR MOTORCYCLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a light-emitting structure, and more particularly to a light-emitting structure which is designed to mount on the exhaust tailpipe of a motor vehicle, such as an automobile, motorcycle, or the like.

BACKGROUND OF THE INVENTION

There are a variety of light-emitting structures which are designed specifically to mount on the exhaust tailpipe of a motor vehicle. These conventional light-emitting structures are generally monotonous in design and poor in visual effect. As a result, they have failed to catch the fancy of consumers at large.

BRIEF SUMMARY OF THE INVENTION

The primary objective of the present invention is to provide a light-emitting structure with features to enhance the visual effect of the light-emitting structure.

The light-emitting structure of the present invention comprises a tubular connector, a control board mounted at an outer end of the tubular connector, and a light diffuser mounted at the outer end of the tubular connector such that the control board is shielded by the light diffuser. The tubular connector is provided in the interior with a fume channel and is fastened at an inner end with the discharge end of an exhaust tailpipe such that the fume channel is in communication with the discharge end of the exhaust tailpipe. The exhaust fume is discharged via the fume channel of the tubular connector. The control board is an integrated circuit board comprising a plurality of light bulbs or light-emitting diodes. The light diffuser serves as a light shield and has a plurality of grooves which are arranged at intervals. The light bulbs or light-emitting diodes are arranged in such a pattern that they are corresponding in location to the grooves of the light shield.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
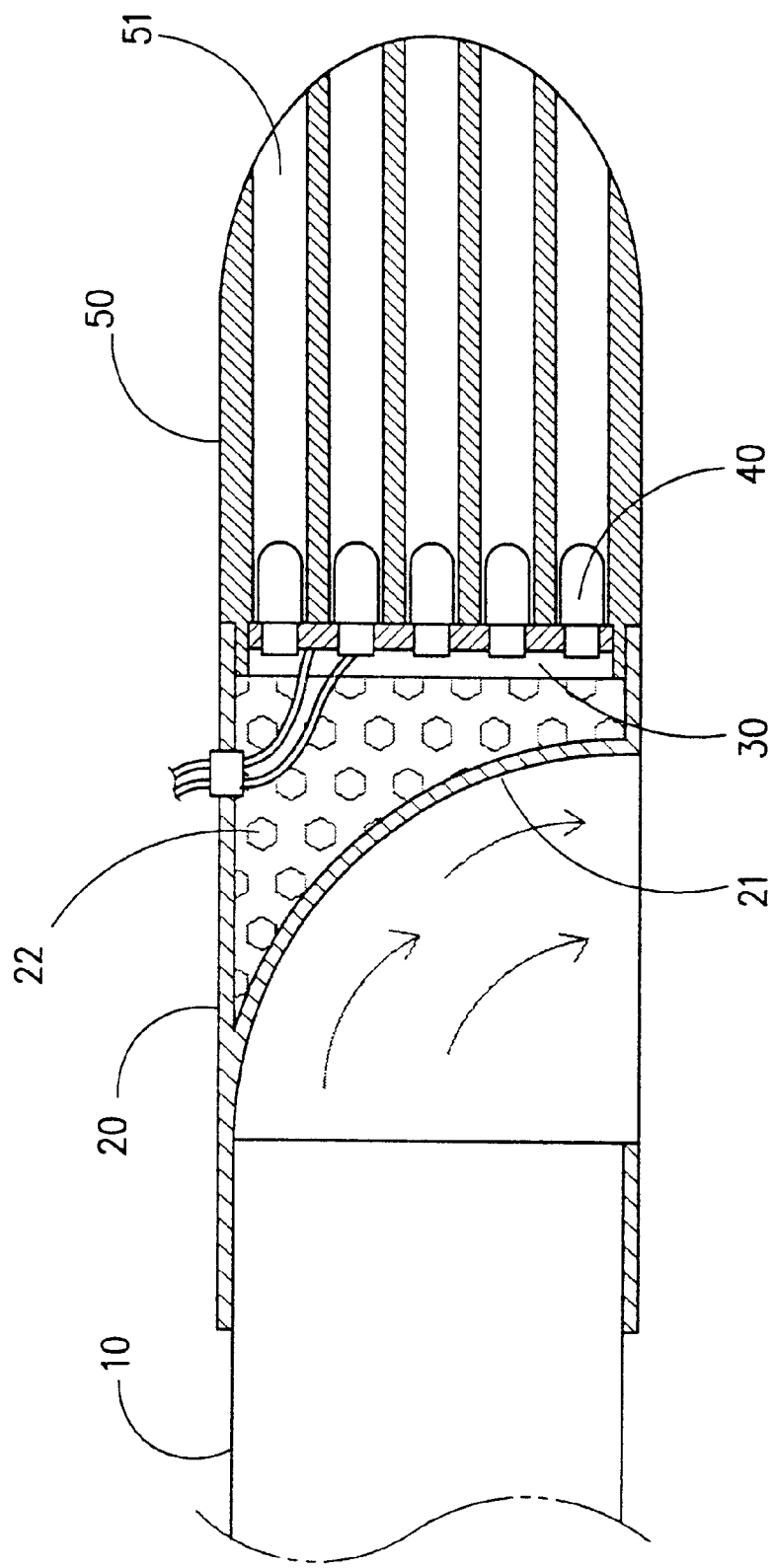
FIG. 1 shows a longitudinal sectional view of a first preferred embodiment of the present invention.
Figure 2:
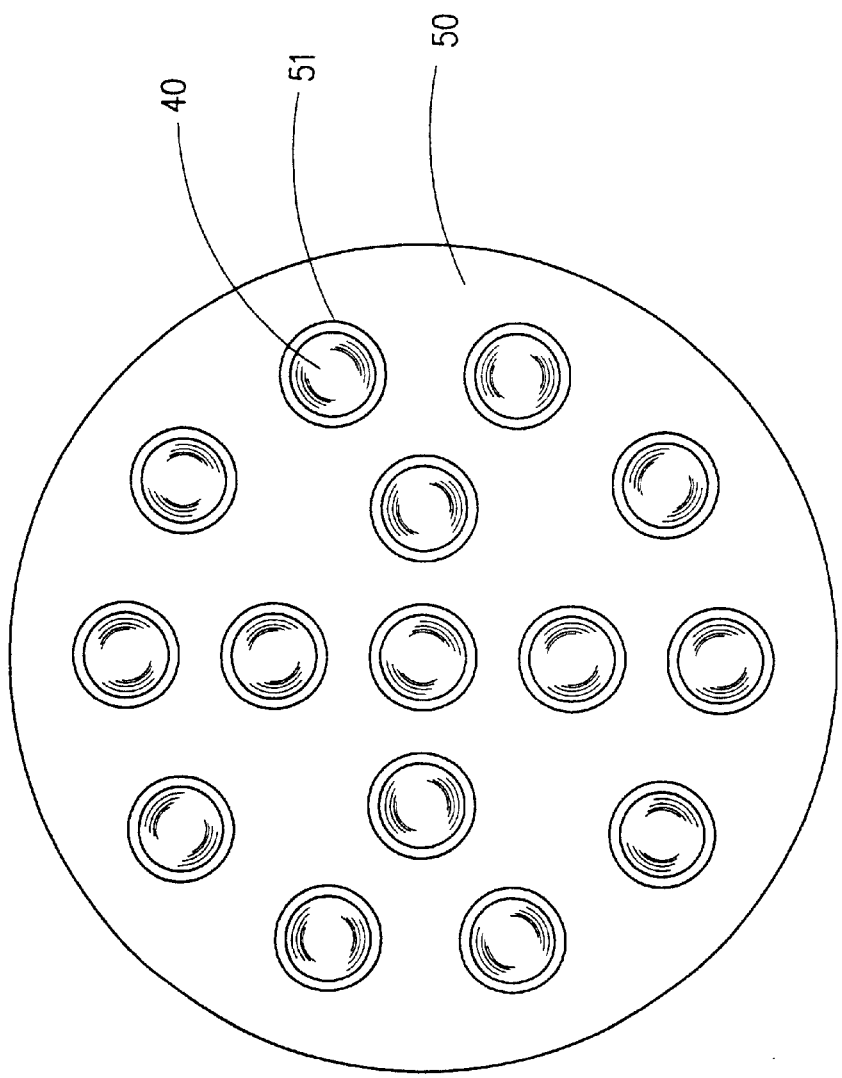
FIG. 2 is a cross-sectional view to show the locational relationship between the light bulbs and the grooves of the light shield of the present invention.

As shown in FIG. 1, a light-emitting structure embodied in the present invention comprises a tubular connector 20, an electronic control board 30, and a light shield 50.

The tubular connector 20 is fastened at an inner end to an exhaust tailpipe 10 of automobile or motorcycle and is provided in the interior with a fume channel 21 in communication with the exhaust tailpipe 10. The exhaust fume is discharged into the atmospheric air via the fume channel 21. The tubular connector 20 is provided in an outer end with a heat insulating material 22 contiguous to the fume channel 21.

The electronic control board 30 is formed of an integrated circuit (IC) and a plurality of light bulbs or light-emitting diodes (LED) 40. The control board 30 is fastened with the outer end of the tubular connector 20 such that the control board 30 is separated from the fume channel 21 of the tubular connector 20 by the heat insulating material 22. The control board 30 is connected to an independent power source or a power source of the automobile or motorcycle. The light bulbs or light-emitting diodes 40 are arranged in a row, as shown in FIGS. 1 and 4. In addition, the light bulbs or light-emitting diodes 40 are arranged in a series of rows which are located one above or behind another, as shown in FIG. 3.

The light shield 50 is transparent and is fastened to the outer end of the tubular connector 20 such that the control board 30 is shielded by the light shield 50. The light shield 50 of the present invention is a light diffuser.

The light shield 50 is provided with a plurality of grooves 51 arranged at intervals. The light bulbs or light-emitting diodes 40 are arranged in such a pattern that they are corresponding in location to the grooves 51 of the light shield 50, as shown in FIGS. 1–4.

Figure 3:
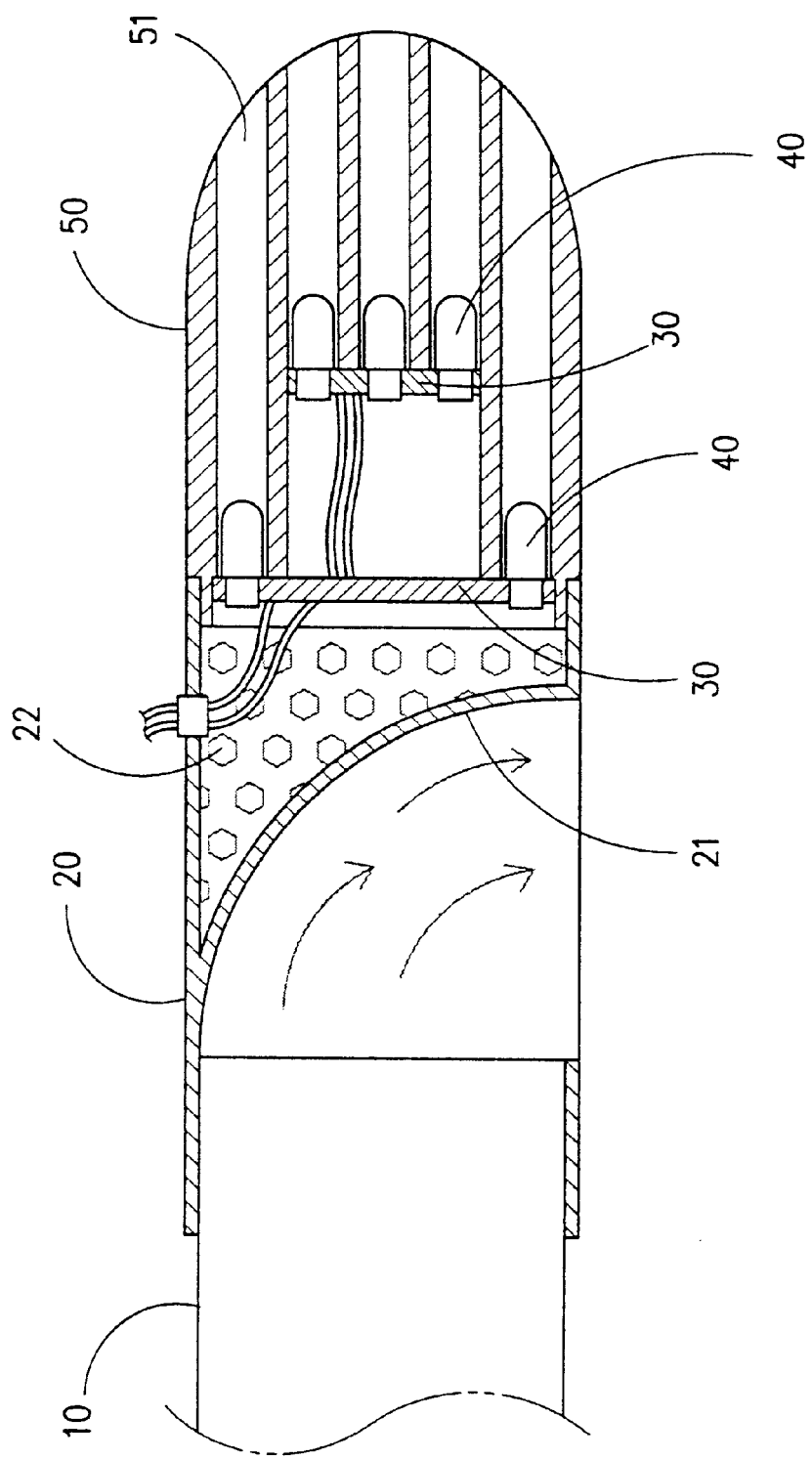
FIG. 3 shows a longitudinal sectional view of a second preferred embodiment of the present invention.
Figure 4:
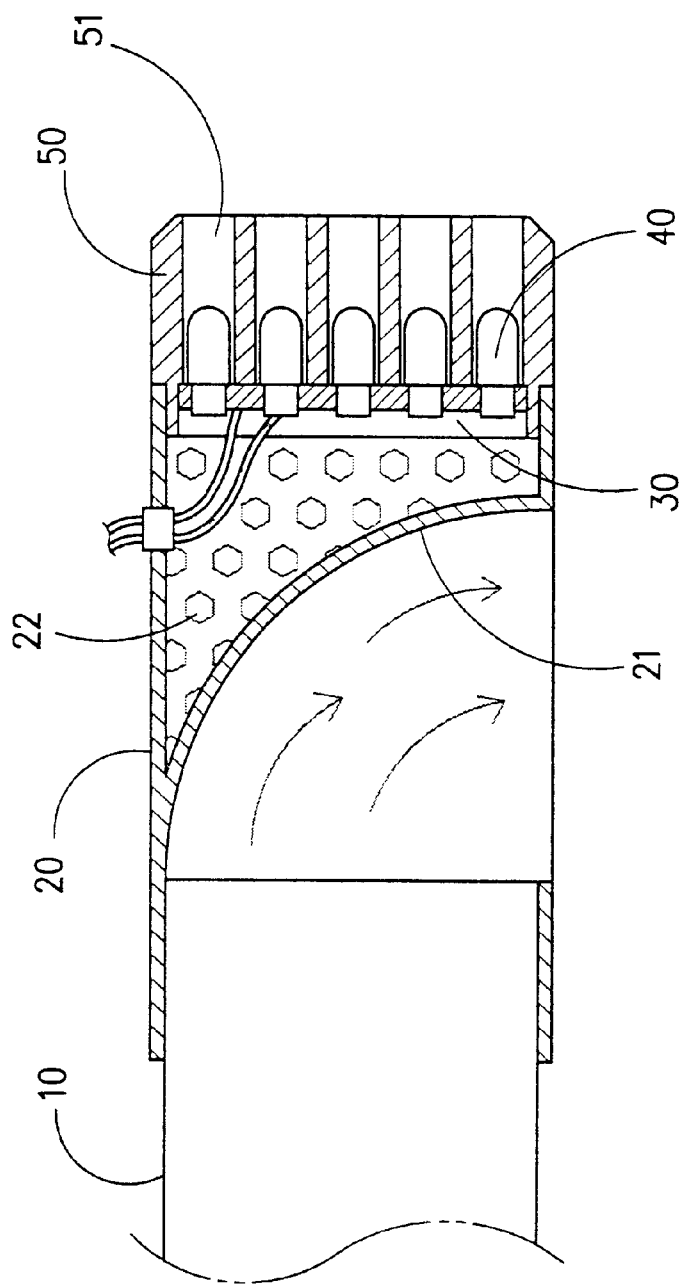
FIG. 4 shows a longitudinal sectional view of a third preferred embodiment of the present invention.

The outer end of the light shield 50 of the present invention has different profiles, as shown in FIGS. 3 and 4.

The embodiments of the present invention described above are to be regarded in all respects as being illustrative and nonrestrictive. Accordingly, the present invention may be embodied in other specific forms without deviating from the spirit thereof. The present invention is therefore to be limited only by the scope of the following claims.

I claim:

1. A light-emitting structure to be mounted on an exhaust tailpipe of motor vehicle, said structure comprising:

a tubular connector comprised of, in an interior, a fume channel and fastened at an inner end thereof to the exhaust tailpipe such that said fume channel is in communication with the exhaust tailpipe;

an electronic control board comprised of an integrated circuit (IC) and a plurality of light bulbs or light-emitting diodes (LED), said control board being fastened to an outer end of said tubular connector such that said control board is connected to a power source; and a light shield of a transparent body and fastened to the outer end of said tubular connector such that said control board is shielded by said light shield;

wherein said tubular connector is provided in the outer end with a heat insulating material whereby said heat insulating material is used to separate said control board from said fume channel of said tubular connector;

wherein said light shield is comprised of a plurality of grooves arranged at intervals, said light bulbs or light-emitting diodes of said control board being arranged in such a pattern that said light bulbs or light-emitting diodes are corresponding in location to said grooves of said light shield.

2. The light-emitting structure as defined in claim 1, wherein said light shield is a light diffuser.

3. The light-emitting structure as defined in claim 1, wherein said light bulbs or light-emitting diodes are arranged in a row.

* * * * *